(12) United States Patent
Chakravarthy et al.

(10) Patent No.: US 7,930,170 B2
(45) Date of Patent: Apr. 19, 2011

(54) COMPUTATIONALLY EFFICIENT AUDIO CODER

(75) Inventors: K. P. P. Kalyan Chakravarthy, Bangalore (IN); Navaneetha K Ruthramoorthy, Framingham, MA (US); Pushkar P Patwardhan, Thanewest (IN); Bishwarup Molndal, Kolkata (IN)

(73) Assignee: Sasken Communication Technologies Limited, Bangalore, Karnataka (IN)

( * ) Notice: Subject to any disclaimer, the term of this patent is extended or adjusted under 35 U.S.C. 154(b) by 2038 days.

(21) Appl. No.: 10/466,027

(22) PCT Filed: Jul. 31, 2001

(86) PCT No.: PCT/IB01/01371
§ 371 (c)(1),
(2), (4) Date: May 20, 2004

(87) PCT Pub. No.: WO02/056297
PCT Pub. Date: Jul. 18, 2002

(65) Prior Publication Data
US 2004/0196913 A1 Oct. 7, 2004

(51) Int. Cl.
*G10L 19/00* (2006.01)
(52) U.S. Cl. ............ 704/200.1; 704/200; 704/500; 704/501; 704/503; 704/504
(58) Field of Classification Search .......... None
See application file for complete search history.

(56) References Cited

U.S. PATENT DOCUMENTS

| | | | |
|---|---|---|---|
| 5,268,685 A * | 12/1993 | Fujiwara | 341/76 |
| 5,481,614 A | 1/1996 | Johnston | 381/2 |
| 5,590,108 A | 12/1996 | Mitsuno et al. | 369/59 |
| 5,592,584 A | 1/1997 | Ferreira et al. | 395/2.12 |
| 5,701,389 A * | 12/1997 | Dorward et al. | 704/203 |
| 5,732,189 A | 3/1998 | Johnston et al. | 395/2.39 |
| 5,742,735 A | 4/1998 | Eberlein et al. | 395/2.38 |

(Continued)

FOREIGN PATENT DOCUMENTS

| | | |
|---|---|---|
| EP | 0612158 | 8/1994 |
| EP | 0725493 | 8/1996 |
| EP | 0725493 A2 | 8/1996 |

OTHER PUBLICATIONS

"International Application No. PCT/IB01/01371 Article 34 Amendment filed Dec. 16, 2002", 3 pgs.

(Continued)

*Primary Examiner* — Leonard Saint Cyr
(74) *Attorney, Agent, or Firm* — Schwegman, Lundberg & Woessner, P.A.

(57) ABSTRACT

The present invention provides a computationally efficient technique for compression encoding of an audio signal, and further provides a technique to enhance the sound quality of the encoded audio signal. This is accomplished by including more accurate attack detection and a computationally efficient quantization technique. The improved audio coder converts the input audio signal to a digital audio signal. The audio coder then divides the digital audio signal into larger frames having a long-block frame length and partitions each of the frames into multiple short-blocks. The audio coder then computes short-block audio signal characteristics for each of the partitioned short-blocks based on changes in the input audio signal. The audio coder further compares the computed short-block characteristics to a set of threshold values to detect presence of an attack in each of the short-blocks and changes the long-block frame length of one or more short-blocks upon detecting the attack in the respective one or more short-blocks.

26 Claims, 6 Drawing Sheets

U.S. PATENT DOCUMENTS

| | | | |
|---|---|---|---|
| 5,794,028 A | 8/1998 | Tran | 395/587 |
| 5,819,214 A | 10/1998 | Suzuki et al. | 704/229 |
| 5,825,320 A | 10/1998 | Miyamori et al. | 341/139 |
| 5,825,979 A | 10/1998 | Tsutsui et al. | 395/2.91 |
| 5,848,391 A | 12/1998 | Bosi et al. | 704/500 |
| 5,974,379 A * | 10/1999 | Hatanaka et al. | 704/225 |
| 6,161,123 A | 12/2000 | Renouard et al. | 709/203 |
| 6,252,851 B1 | 6/2001 | Siu et al. | 370/236 |
| 6,263,312 B1 * | 7/2001 | Kolesnik et al. | 704/500 |
| 6,772,113 B1 * | 8/2004 | Fujita et al. | 704/219 |
| 6,799,164 B1 * | 9/2004 | Araki | 704/500 |

OTHER PUBLICATIONS

"International Application No. PCT/IB01/01371 Chapter II Demand filed Aug. 9, 2002", 8 pgs.

"International Application No. PCT/IB01/01371 International Preliminary Examination Report mailed Jan. 20, 2003", 6 pgs.

"International Application No. PCT/IB01/01371 International Search Report mailed Mar. 7, 2002", 10 pgs.

"International Application No. PCT/IB01/01371 Written Opinion mailed Oct. 16, 2002", 6 pgs.

\* cited by examiner

COMPUTATIONALLY EFFICIENT AUDIO CODER

FIELD OF THE INVENTION

This invention relates generally to processing of information signals and more particularly pertains to techniques for encoding audio signals inclusive of voice and music using a perceptual audio coder.

BACKGROUND

A Perceptual audio coder is an apparatus that takes series of audio samples as input and compresses them to save disk space or bandwidth. The Perceptual audio coder uses properties of the human ear to achieve the compression of the audio signals.

The technique of compressing audio signals involves recording an audio signal through a microphone and then converting the recorded analog audio signal to a digital audio signal using an A/D converter. The digital audio signal is nothing but a series of numbers. The audio coder transforms the digital audio signal into large frames of fixed-length. Generally, the fixed length of each large frame is around 1024 samples. The analog signal is sampled at a specific rate (called the sampling frequency) and this results in a series of audio samples. Typically a frame of samples is a series of numbers. The audio coder can only process one frame at a time. This means that the audio coder can process only 1024 samples at a time. Then the audio coder transforms the received fixed-length frames (1024 samples) into a corresponding frequency domain. The transformation to a frequency domain is accomplished by using an algorithm, and the output of this algorithm is another set of 1024 samples representing a spectrum of the input. In the spectrum of samples, each sample corresponds to a frequency. Then the audio coder computes masking thresholds from the spectrum of samples. Masking thresholds are nothing but another set of numbers, which are useful in compressing the audio signal. The following illustrates the computing of masking thresholds.

The audio coder computes an energy spectrum by squaring the spectrum of the 1024 samples. Then the samples are further divided into series of bands. For example, the first 10 samples can be one band and the next 10 samples can be another subsequent band and so on. Note that the number of samples (width) in each band varies. The width of the bands is designed to best suit the properties of the human ear for listening to frequencies of sound. Then the computed energy spectrum is added to each of the bands separately to produce a grouped energy spectrum.

The audio coder applies a spreading function to the grouped energy spectrum to obtain an excitation pattern. This operation involves simulating and applying the effects of sounds in one critical band to a subsequent (neighboring) critical band. Generally this step involves convolution with a spreading function, which results in another set of fixed numbers.

Then, based on the tonal or noise-like nature of the spectrum in each critical band, a certain amount of frequency-dependent attenuation is applied to obtain initial masking threshold values. Then, by using an absolute threshold of hearing, the final masked thresholds are obtained. Absolute threshold of hearing is a set of amplitude values below which the human ear will not be able to hear.

Then the audio coder combines the initial masking threshold values with the absolute threshold values to obtain the final masked threshold values. Masked threshold value means a sound value below which a sound is not audible to the human ear (i.e., an estimate of maximum allowable noise that can be introduced during quantization).

Using the masked threshold values, the audio coder computes perceptual entropy (PE) of a current frame. The perceptual entropy is a measure of the minimum number of bits required to code a current frame of audio samples. In other words, the PE indicates how much the current frame of audio samples can be compressed. Various types of algorithms are currently used to compute the PE.

The audio coder receives the grouped energy spectrum, the computed masking threshold values, and the PE and quantizes (compresses) the audio signals. The audio coder has only a restricted number of bits allocated for each frame depending on a bit rate. It distributes these bits across the spectrum based on the masking threshold values. If the masking threshold value is high, then the audio signal is not important and is hence represented using a smaller number of bits. Similarly, if masking threshold is low, the audio signal is important and hence represented using a higher number of bits. Also, the audio coder checks to ensure that the allocated number of bits for the audio signals is not exceeded. The audio coder generally applies a two-loop strategy to allocate and monitor the number of bits to the spectrum. The loops are generally nested and are called Rate Control and Distortion Control Loops. The Rate Control Loop controls the distribution of the bits not to exceed the allocated number of bits, and the Distortion control loop does the distribution of the bits to the received spectrum. Quantization is a major part of the perceptual audio coder. The performance of the audio coder can be significantly improved by reducing the number of calculations performed in the control loops. The current quantization algorithms are very computation intensive and hence result in a slower operation.

Earlier we have seen that the audio coder receives one frame of samples (1024 samples in length) as input and converts the frame of samples into a spectrum and then quantizes using masking thresholds. Sometimes the input audio signal may vary quickly (when the properties of a signal change abruptly). For example, if there is a sudden heavy beat in the audio signal, and if the audio coder receives a frame of 1024 samples in length (including the heavy beat) due to inadequate temporal masking in a signal including abrupt changes, a problem called pre-echo can occur. This is because the sound signal contains error after quantization, and this error can result in an audible noise before the onset of the heavy beat, hence called the pre-echo. Heavy beats are also called 'attacks.' A signal is said to have an attack if it exhibits a significant amount of non-stationarity within the duration of a frame under analysis. For example, sudden increase in amplitudes of a time signal within a typical duration of analysis is an attack. To avoid this problem the audio signal is coded with frames having smaller frame lengths instead of the long 1024 samples. To keep continuity in the number of samples given as input usually 8 smaller blocks of 128 samples are coded (8×128 samples=1024 samples). This will restrict the heavy beat to one set of 128 samples among 8 smaller blocks, and hence the noise introduced will not spread to the neighboring smaller blocks as pre-echo. But the disadvantage of coding in 8 smaller blocks of 128 samples is that they require more bits to code than required by the larger blocks of 1024 samples in length. So the compression efficiency of the audio coder is significantly reduced. To improve the compression efficiency, the heavy beats have to be detected accurately so that the smaller blocks can be applied only around the heavy beats. It is important that the heavy beats be accurately detected, or else pre-echo can occur. Also, a false detection of heavy beats can result in significantly reduced compression efficiency. Current methods to detect the heavy beats use the PE. Calculating the PE is computationally very intensive and also not very accurate.

Also, we have seen earlier that the blocks that have attacks should be coded as smaller blocks having 128 samples and others as larger blocks having 1024 samples. The smaller frame lengths of 128 samples are called 'short-blocks', and the 1024 samples frame length are called 'long-blocks.' We have also seen that the short-blocks require more bits to code than the long-blocks. Also for each large frame there is a fixed number of bits allocated. If we can intelligently save some bits while coding a long-block and use the saved bits in a short-block, the compression efficiency of the audio coder can be significantly increased. For storing the bits, a 'Bit Reservoir mechanism' is needed. Since long-blocks do not need a large number of bits, the unused bits from the long-blocks can be saved in the bit reservoir and used later for a short-block. Currently there are no efficient techniques to save and allocate bits between long and short-blocks to improve the compression efficiency of the audio coder.

The audio signal can be of two types (i) single channel or mono-signal and (ii) multi-channel or stereo signal to produce spatial effects. The stereo signal is a multi-channel signal comprised of two channels, namely left and right channels. Generally the audio signals in the two channels have a large correlation between them. By using this correlation the stereo channels can be coded more efficiently. Instead of directly coding the stereo channels, if their sum and difference signals are coded and transmitted where the correlation is high, a better quality of sound is achieved at a same bit rate. When the audio signal is a stereo signal, the audio coder can operate in two modes (a) normal mode and (b) M-S mode. The M-S mode means encoding the sum and difference of the left and right channels of the stereo. Currently the decision to switch between the normal and M-S modes is based on the PE. As explained before, computing PE is very computation intensive and inconsistent.

Therefore, there is a need in the art for a computationally efficient quantization technique. Also, there is a need in the art for an improved attack detection technique that is computationally less intensive and more accurate, to improve the compression efficiency of the audio coder. In addition, there is a need in the art for a technique to allocate the bits between the long and short-blocks to improve the computation efficiency of the audio coder. Furthermore, there is also a need in the art for a technique that is computationally efficient and more accurate in switching between the normal and the M-S modes when the audio signal is a stereo signal.

SUMMARY OF THE INVENTION

The present invention provides an improved technique for detecting an attack in an input audio signal to reduce pre-echo artifacts caused by attacks during compression encoding of the input audio signal. This is accomplished by providing a computationally efficient and more accurate attack detection technique. The improved audio coder converts the input audio signal to a digital audio signal. The audio coder then divides the digital audio signal into larger frames having a long-block frame length and partitions each of the frames into multiple short-blocks. The audio coder then computes short-block audio signal characteristics for each of the partitioned short-blocks based on changes in the input audio signal. The audio coder further compares the computed short-block characteristics to a set of threshold values to detect presence of an attack in each of the short-blocks and changes the long-block frame length of one or more short-blocks upon detecting the attack in the respective one or more short-blocks.

Further, the improved audio coder increases compression efficiency by efficiently allocating bits between long and short-blocks. The audio coder that is computationally efficient and more accurate in switching between the normal and M-S modes when the audio signal is a stereo signal. In addition, the present invention also describes a technique for reducing the computational complexity of quantization.

DETAILED DESCRIPTION

The present invention provides an improved audio coder by increasing the efficiency of the audio coder during compression of an input audio signal. This is accomplished by providing computationally efficient and more accurate attack detection and quantization technique. Also, compression efficiency is improved by providing a technique to allocate bits between long and short-blocks. In addition, the present invention provides an audio coder that is computationally efficient and more accurate in switching between the normal and M-S modes when the audio signal is a stereo signal. The words 'encode' and 'code' are used interchangeably throughout this document to represent the same audio compression scheme. Also the words 'encoder' and 'coder' are used interchangeably throughout this document to represent the same audio compression system.

Figure 1:
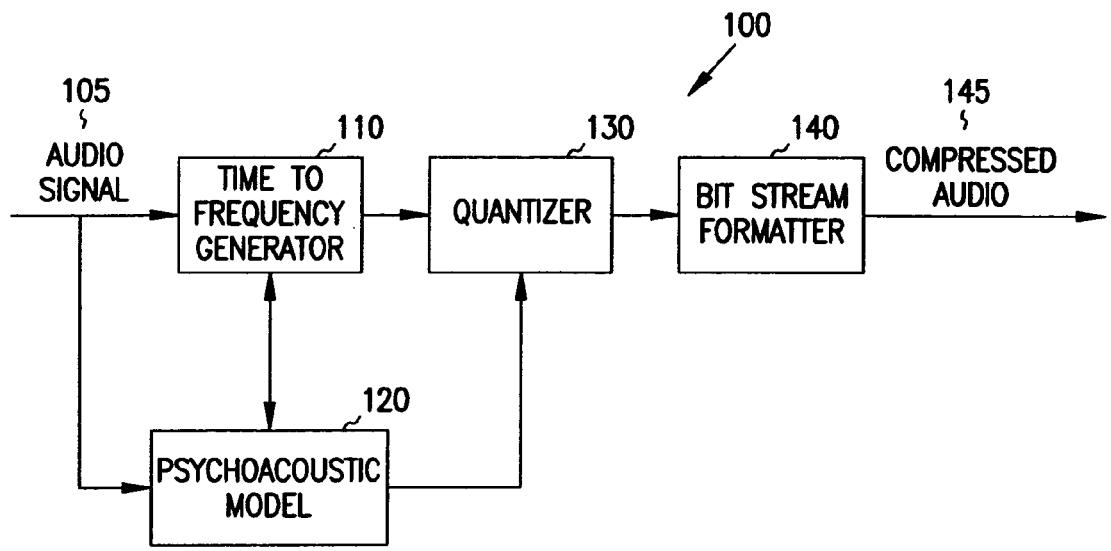
FIG. 1 is block diagram of a prior-art perceptual audio coder.

FIG. 1 shows a prior-art perceptual audio coder 100 including major components and their interconnections. Shown in FIG. 1 are Time frequency generator 110, Psychoacoustic model 120, Quantizer 130, and BitStream Formatter 140. The technique of compressing audio signals involves recording an audio signal through a microphone and then converting the recorded analog audio signal to a digital audio signal using an A/D converter. The digital audio signal is nothing but a series of numbers.

The Time frequency generator 110 receives the series of numbers in large frames (blocks) of fixed-length 105. Generally, the fixed length of each frame is around 1024 samples (series of numbers). Time frequency generator 110 can only process one frame at a time. This means that the audio coder 100 can process only 1024 samples at a time. The Time frequency generator 110 then transforms the received fixed-length frames (1024 samples) into corresponding frequency domains. The transformation to the frequency domain is accomplished by using an algorithm, and the output of this algorithm is another set of 1024 samples called a spectrum of the input. In the spectrum, each sample corresponds to a frequency. Then the Time frequency generator 110 computes masking thresholds from the spectrum. Masking thresholds are nothing but another set of numbers that are useful in compressing the audio signal. The following illustrates one example embodiment of computing masking thresholds.

The Time frequency generator 110 computes an energy spectrum by squaring the spectrum of 1024 samples. Then the samples are further divided into series of bands. For example, the first 10 samples can be one band and the next 10 samples can be another subsequent band and so on. Note that the number of samples (width) in each band varies. The width of the bands is designed to best suit the properties of the human ear for listening to frequencies of sound. Then the computed energy spectrum is added to each of the bands separately to produce a grouped energy spectrum.

The Time frequency generator 110 then applies a spreading function to the grouped energy spectrum to obtain an excitation pattern. This operation involves simulating and applying the effects of sounds in one critical band to a subsequent (neighboring) critical band. Generally this step involves using a convolution algorithm between the spreading function and the energy spectrum.

Based on the tonal or noise-like nature of the spectrum in each critical band, a certain amount of frequency dependent attenuation is applied to obtain initial masking threshold values. Using an absolute threshold of hearing, the final masked thresholds are obtained. Absolute threshold of hearing is a set of amplitude values below which the human ear will not be able to hear.

The Psychoacoustic model 120 combines the initial masking threshold values with the absolute threshold values to obtain the final masked threshold values. Masked threshold value means a sound value below which quantization noise is not audible to the human ear (it is an estimate of the maximum allowable noise that can be introduced during quantization).

Using the masked threshold values, the Psychoacoustic model 120 computes perceptual entropy (PE). The perceptual entropy is a measure of the minimum number of bits required to code a current frame of audio samples. In other words, the PE indicates how much the current frame of audio samples can be compressed. Various types of algorithms are currently used to compute the PE.

The Quantizer 130 then receives the spectrum, the computed masking threshold values, and the PE, and compresses the audio signals. The Quantizer 130 has only a specific number of bits allocated for each frame. It distributes these bits across the spectrum based on the masking threshold values. If the masking threshold value is high, then the audio signal is not important and hence can be represented using a smaller number of bits and similarly, if the masking threshold is low, the audio signal is important and hence can only be represented using a higher number of bits. Also, the Quantizer 130 checks to make sure that the allocated number of bits for the audio signals is not exceeded. The Quantizer 130 generally applies a two-loop strategy to allocate and monitor the number of bits to the received spectrum. The loops are generally nested and are called Rate control and Distortion control loops. The Rate Control loop controls the global gain so that the number of bits used to code the spectrum does not exceed the allocated number of bits, and the Distortion control loop does the distribution of the bits to the received spectrum. Quantization is a major part of the perceptual audio coder 100. The performance of the Quatizer 130 can be significantly improved by reducing the number of calculations performed in the control loops. The current quantization algorithms used in the Quantizer 130 are very computation intensive and hence result in slower operation.

BitStream formatter 140 receives the compressed audio signal (coded bits) from the Quatizer 130 and converts it into a desired format/syntax (specified coding standard) such as ISO MPEG-2 AAC.

Figure 2:
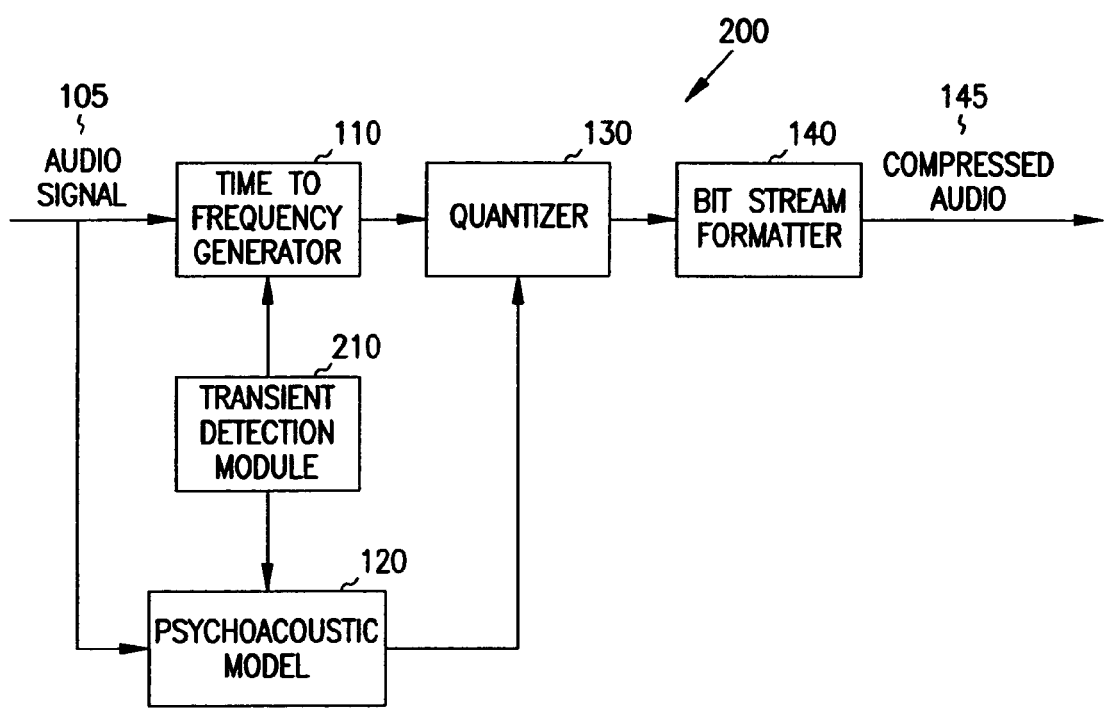
FIG. 2 is a block diagram of a perceptual audio coder according to the teaching of the present invention.

FIG. 2 is a block diagram of one embodiment of a perceptual audio coder 200 according to the teachings of the present invention. In addition to what is shown in FIG. 1, in this embodiment the perceptual audio coder 200 includes a transient detection module 210. The transient detection module is coupled to receive the input audio signal. Also, the transient detection module 210 is coupled to provide an input to the time frequency generator 110 and psychoacoustic model 120.

In operation, the transient detection module 210 receives the input audio signal 105 as a series of numbers in frames of fixed-length and partitions each of the frames into multiple short-blocks. In some embodiments, the fixed length is a long-block frame length of 1024 samples of digital audio signal. The digital audio signal comprises series of numbers. The long-block is used when there is no attack in the input audio signal. In some embodiments, the short-blocks have a frame length in the range of about 100 to 300 samples of digital audio signal.

The transient detection module 210 computes short-block audio signal characteristics for each of the partitioned short-blocks. In some embodiments, computing the short-block audio signal characteristics includes computing inter-block differences (xdiff(m) for an mth short-block) and inter-block ratios, and further determining maximum inter-block difference and ratio, respectively. In some embodiments, computing the inter-block differences includes summing a square of the differences between samples in adjacent short-blocks. Further, in some embodiments, the inter-block ratios are computed to better isolate (detect) the attacks. In this embodiment, the inter-block ratios are computed by dividing the adjacent computed inter-block differences as follows:

$r[0]=xdiff[0]/pxdif$ $r[1]=xdiff[1]/xdiff[0]$ $r[2]=xdiff[2]/xdiff[1]$ $r[3]=xdiff[3]/xdiff[2]$ $r[4]=xdiff[4]/xdiff[3]$ where 'pxdif' is $xdiff_p[4]$ (which is xdiff[4] of the previous frame)

The transient detection module 210 compares the computed short-block characteristics with a set of threshold values to detect the presence of an attack in each of the short-blocks. Then the transient detection module 210 changes the long-block frame length of the frame including the attack based on the outcome of the comparison, and inputs the changed frame length to the time frequency generator 110 to reduce the effect of the pre-echo caused by the attack. In some embodiments, the time frequency generator uses short-blocks to restrict the attack to a smaller frame so that the attack does not spread to adjacent smaller frame lengths to reduce the pre-echo artifact caused by the attack. In this embodiment, the smaller frames have a frame length in the range of about 100 to 200 samples of digital audio signal.

Figure 3:
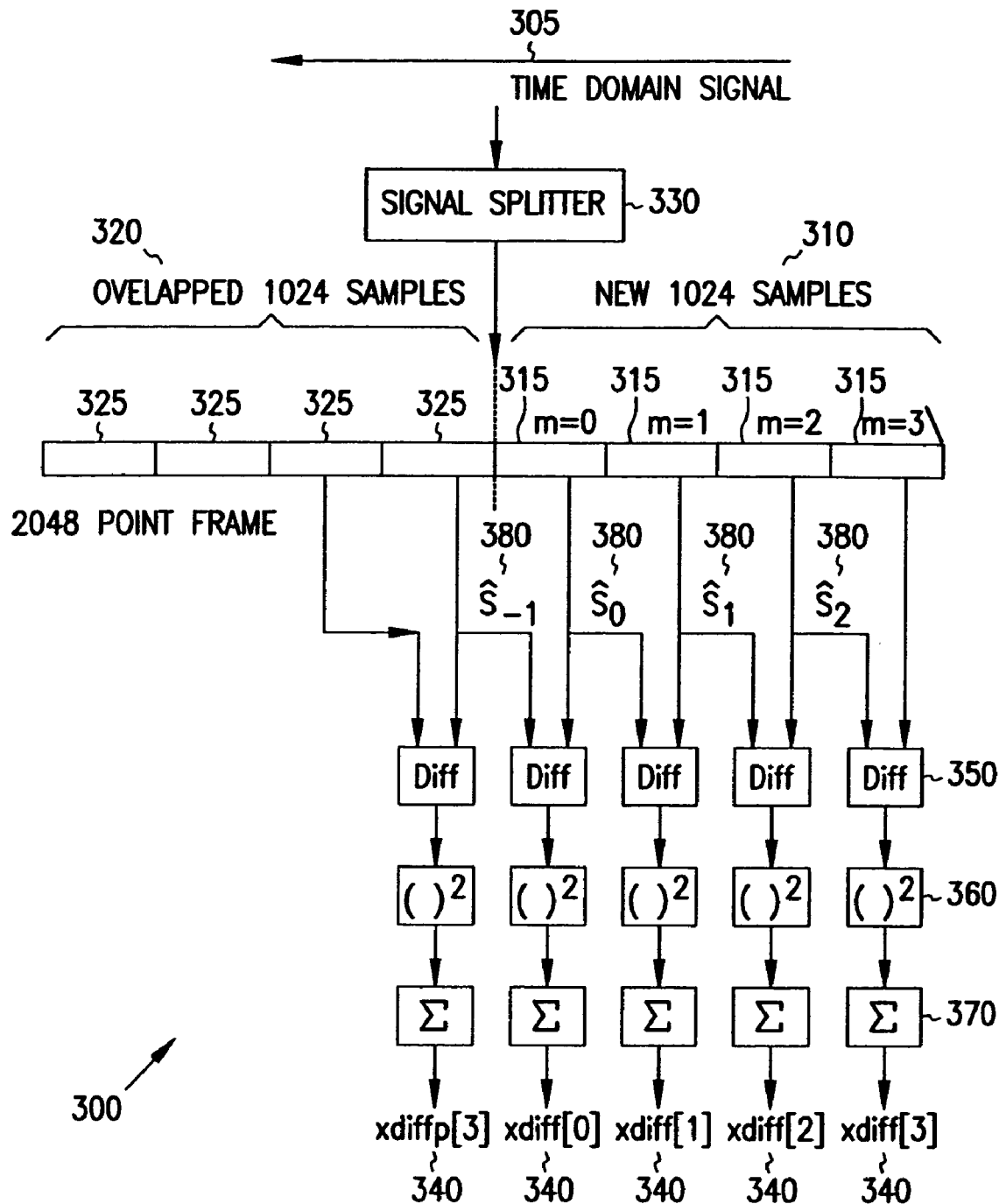
FIG. 3 is a block diagram of one example embodiment of computing inter-block differences.

FIG. 3 illustrates an overview of one embodiment of computing inter-block differences to detect the presence of an attack in an input audio signal according to the teachings of the present invention. As explained earlier with reference to FIGS. 1 and 2, the input audio signal 305 is divided into large frames by a signal splitter 330 and processed by the perceptual audio coder 200 into frames. Each of the frames has a long-block frame length of 1024 samples of digital audio signal. The transient detection module 210 detects the presence of an attack by using two adjacent incoming frames at a time. In the example embodiment shown in FIG. 3 the transient detection module 210 receives two adjacent current and previous frames 310 and 320, respectively. Also shown are the partitioned short-blocks 315 and 325 corresponding to the frames 310 and 320, respectively. In the embodiment shown in FIG. 3, each of the short-blocks 315 and 325 corresponding to the frames 310 and 320, respectively, have frame lengths of 256 samples. The last five short-blocks (the four short-blocks 315 from the frame 310 and one adjacent short-block 325 from the frame 320) are used in detecting the presence of an attack in the adjacent frame 320 before transformation to frequency domain by the Time frequency generator 110.

The following computational sequence is used in detecting the presence of an attack in the adjacent frame 320:

The inter block differences xdiff(m) 340 in the time domain are computed using the following algorithm:

$$xdiff(m) = \frac{4}{N} \sum_{j=0}^{N/4-1} [s(j,m) - s(j,m-1)]^2$$

where s(j.m) is the j'th time domain sample of the m'th short-block and s(j,m−1) corresponds to time domain samples of the last short-block of the adjacent frame 320. The Diff blocks 350 shown in FIG. 3 compute the difference between two adjacent short-blocks 315 and 325. The ( )² blocks 360 in FIG. 3 compute the square of the respective computed differences. The Σ blocks 370 compute the sum, and finally the xdiff(m) is computed as indicated in the above algorithm.

In some embodiments, the short-block frame lengths are tuned to the application in use. In these embodiments, distance between the large frames is computed to determine an optimum size for the short-block frame lengths. The following algorithm is used to compute the distance between the large frames:

$$xdiff(m) = d(\hat{S}_m, \hat{S}_{m-1})$$

where $\hat{S}_m$ and $\hat{S}_{m-1}$ 380 are the signal sub-vectors for the $m^{th}$ and $(m-1)^{th}$ short-blocks, and d (.) is a function that returns a distance measure between the two vectors.

Figure 4:
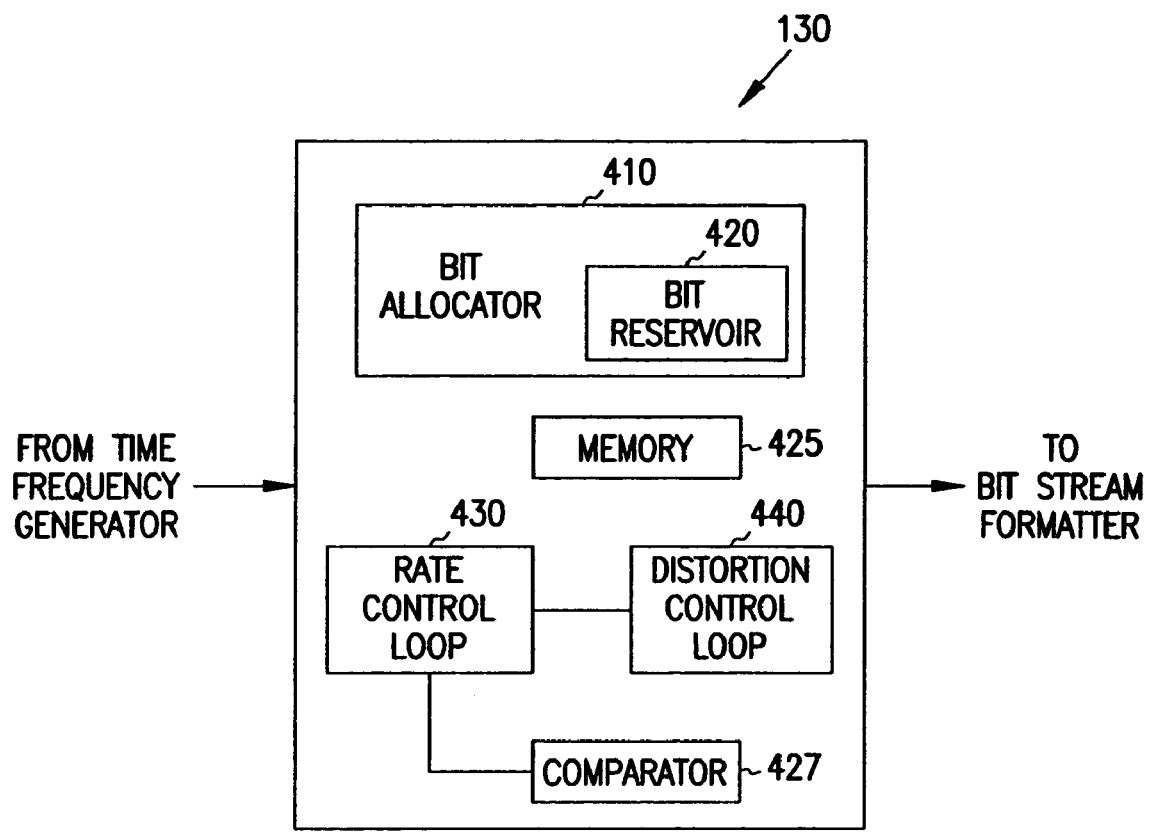
FIG. 4 is a block diagram of one embodiment of major components of the Quantizer shown in FIG. 2 and their interconnections.

FIG. 4 illustrates one embodiment of the major components of the Quantizer 130 and their interconnections as shown in FIG. 2 used in a bit allocation strategy according to the teachings of the present invention. Shown in FIG. 4 are Bit Allocator 410, Bit Reservoir 420, and Memory 425. The technique of bit allocation strategy according to the teachings of the present invention includes efficient distribution of bits to different portions of the audio signal. Bits required to code the current frame can be estimated from the perceptual entropy of that frame. Extensive experimentation suggests that the number of bits required to encode is considerably less for a larger frame length than for a smaller frame length. Also, it has been found that the larger frames generally require less than the average number of bits to encode large frames. The amount of reduction below the average number of bits is a function of bit rate. Using this technique also results in large savings of bits during stationary portions of the audio signal. The technique of bit allocation strategy according to the teachings of the present invention is explained in detail in the following section.

The Quantizer 130 receives the large and small frames including the samples of digital audio signal from the time frequency generator 110. Further, the Quantizer 130 receives the computed perceptual entropy from the psychoacoustic model 120 shown in FIG. 2. The Bit Allocator 410 computes an average number of bits that can be allocated to each of the received large frames. In some embodiments, the Bit Allocator 410 determines the average number of bits by using the long-block frame length and sampling frequency of the input audio signal. Further, the Bit Allocator 410 computes a bit rate and a reduction factor based on the computed bit rate, and the received perceptual entropy. In addition, the Bit Allocator 410 computes a reduced average number of bits that can be allocated for each of the large frames using the computed reduction factor. Further, the Bit Allocator 410 computes remaining bits by subtracting the computed average number of bits using the computed reduced average number of bits. The Bit Allocator 410 includes a Bit Reservoir 420 to receive the remaining bits. The Bit Allocator 410 allocates a reduced average number of bits to the current frame and stores the remaining bits in the Bit Reservoir 420 when the current frame is a large frame. Further, the Bit Allocator allocates the reduced number of bits along with the stored bits from the Bit Reservoir 420 when the current frame is a small frame to improve the bit allocation between the large and small frames, to enhance sound quality of the compressed audio signal. The Bit Allocator 410 repeats the above process of bit allocation to a next adjacent frame. In some embodiments, the allocation of bits to a small frame is based on number of bits available in the Bit Reservoir 420, bit rate, and a scaling applied to the denominator, which actually distributes the bits across continuous sequence of frames that use finer time resolution. At the same time, the Bit Allocator 410 makes sure that the Bit Reservoir 420 is not depleted too much.

FIG. 4 also illustrates one embodiment of major components and their interconnections in the Quantizer 130 shown in FIG. 2 used in reducing computational complexity in the Quantizer 130 according to the teachings of the present invention. Also shown in FIG. 4 are Rate Control Loop 430 (also generally referred to as "Inner Iteration Loop"), Comparator 427, and Distortion Control Loop 440 (also generally referred to as "Outer Iteration Loop").

The Rate Control Loop 430 computes global gain, which is commonly referred to as "common scalefac" for a given set of spectral values with a pre-determined value for the maximum number of bits available for encoding the frame (referred to as "available bits"). The Rate Control Loop arrives at a unique solution for the common scalefac value for a given set of spectral data for a fixed value of available bits, so any other variation of the Rate Control Loop must necessarily arrive at the same solution. Efficiency of the Rate Control Loop is increased by reducing the number of iterations required to compute the common scalefac value. The technique of reducing the number of iterations required to compute the common scalefac value according to the teachings of the present invention is discussed in detail in the following section.

The Quantizer 130 stores a start common scalefac value of a previous adjacent frame to use in quantization of a current frame. The Rate Control Loop 430 computes the common scalefac value for the current frame using the stored start common scalefac value as a starting value during computation of iterations by the Rate Control Loop 430 to reduce the number of iterations required to compute the common scalefac value of the current frame. Further, the Rate control Loop 430 computes counted bits using the common scalefac value of the current frame. The comparator 427 coupled to the Rate control Loop compares the computed count bits with available bits. The Rate Control Loop changes the computed common scalefac value based on the outcome of the comparison. In some embodiments, the count bits comprises bits required to encode a given set of spectral values for the current frame.

The Distortion Control Loop 440 is coupled to the Rate Control Loop 430 to distribute the bits among the samples in the spectrum based on the masking thresholds received from the psychoacoustic model. Also, the Distortion Control Loop 440 tries to allocate bits in such a way that quantization noise is below the masking thresholds. The Distortion Control Loop 440 also sets the starting value of start common scalefac to be used in the Rate Control Loop 430.

Figure 5:
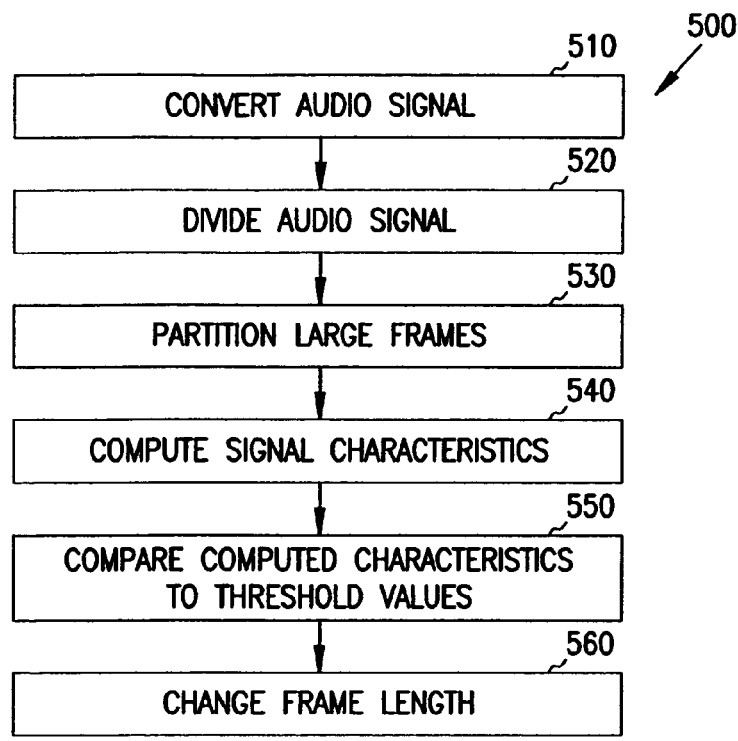
FIG. 5 is a flowchart illustrating the overall operation of the embodiment shown in FIG. 2.

FIG. 5 illustrates one example embodiment of a process 500 of detecting an attack in an input audio signal to reduce a pre-echo artifact caused by the attack during a compression encoding of the input audio signal. The process 500 begins with step 510 by receiving an input audio signal and converting the received input audio signal into a digital audio signal. In some embodiments, the attack comprises a sudden increase in signal amplitude.

Step 520 includes dividing the converted digital audio signal into large frames having a long-block frame length. In some embodiments, the long-block frame length comprises 1024 samples of digital audio signal. In this embodiment, the samples of digital audio signal comprise series of numbers. In this embodiment, the long-block frame length comprises a frame length used when there is no attack in the input audio signal.

Step 530 includes partitioning each of the large frames into multiple short-blocks. In some embodiments, partitioning large frames into short-blocks includes partitioning short-blocks having short-block frame lengths in the range of about 100 to 300 samples.

Step 540 includes computing short-block characteristics for each of the partitioned short-blocks based on changes in the input audio signal. In some embodiments, the computing of the short-block characteristics includes computing inter-block differences and determining a maximum inter-block difference from the computed inter block differences. In some embodiments, the computing of short-block characteristics further includes computing inter-block ratios and determining a maximum inter-block ratio from the computed inter-block ratios. In this embodiment, the computing of inter-block differences includes summing a square of the differences between samples in adjacent short-blocks. Also in this embodiment the computing of the inter-block ratios includes dividing the adjacent computed inter-block differences. The process of computing the short-block characteristics is discussed in more detail with reference to FIG. 3.

Step 550 includes comparing the computed short-block characteristics to a set of threshold values to detect a presence of the attack in each of the short-blocks. Step 560 includes changing the long-block frame length of one or more large frames based on the outcome of the comparison to reduce the pre-echo artifact caused by the attack. In some embodiments, the changing of the long-block frame length means changing to include multiple smaller frames to restrict the attack to one or more smaller frames so that the pre-echo artifact caused by the attack does not spread to the adjacent larger frames. In some embodiments, the smaller frame lengths include about 100 to 200 samples of digital audio signal.

Figure 6:
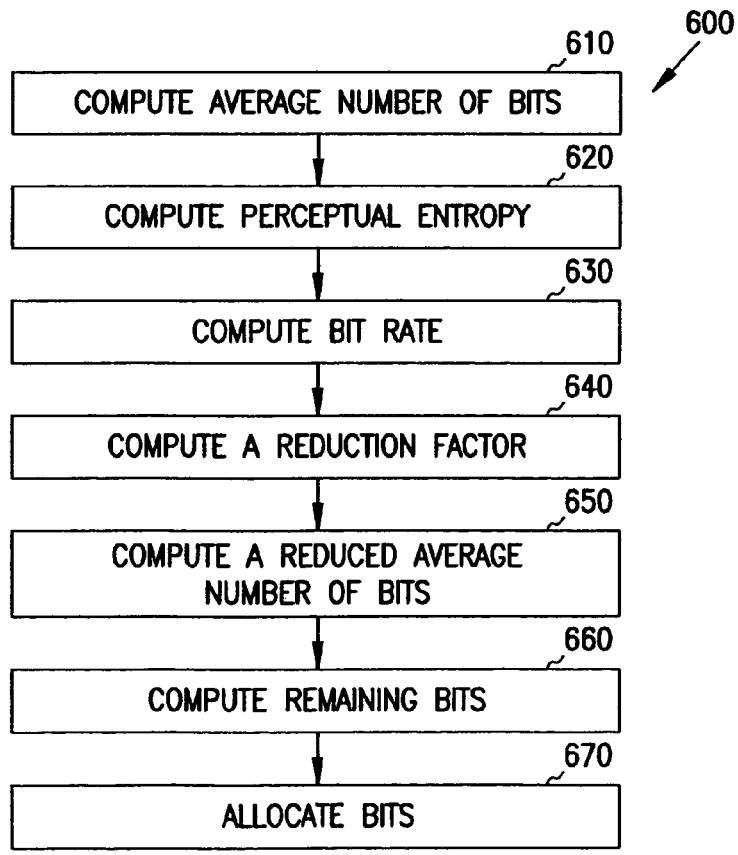
FIG. 6 is a flowchart illustrating the operation of the Bit Allocator shown in FIG. 4.

FIG. 6 illustrates one example embodiment of an operation 600 of an efficient strategy for bit allocation to the large and small frames by the Bit Allocator shown in FIG. 4 according to the present invention. The operation 600 begins with step 610 by computing an average number of bits that can be allocated for each of the large frames. In some embodiments, the average number of bits is computed by determining the long-block frame length, the sampling frequency of the input audio signal, and the bit rate of the coding the input audio signal.

Step 620 includes computing a perceptual entropy for the current frame of audio samples using the masking thresholds computed as described in detail with reference to FIG. 1. Step 630 includes computing a bit rate using a sampling frequency and the current frame length. Step 640 includes computing a reduction factor based on the computed bit rate and the perceptual entropy. Step 650 includes computing a reduced average number of bits that can be allocated to each of the large frames using the computed reduction factor. Step 660 includes computing remaining bits by subtracting the computed average number of bits with the computed reduced average number of bits. Step 670 includes allocating bits based on the large or small frame. In some embodiments, if the current frame to be coded is large, then a reduced number of bits are allocated to the current frame and the remaining bits are stored in a Bit Reservoir, and if the current frame to be coded is small, then the reduced number of bits are allocated along with the stored bits from the Bit Reservoir. In some embodiments, the above-described operation 600 repeats itself for a next frame adjacent to the current frame.

The following example further illustrates the operation of the above-described operation 600 of the bit allocation strategy:

For example, if a given mono (single) audio signal at a bit rate of 64 kbps is sampled at a sampling frequency of 44100 Hz (meaning there are 44100 samples per second which needs to be encoded at a bit rate of 64000 bits per second) and the long-block frame length is 1024 samples, the average number of bits are computed as follows:

$$\text{Average number of bits} = \frac{64000 * 1024}{44100}$$
$$= 1486.08 \sim 1486$$

Therefore each frame is coded using 1486 bits. Each of the frames does not require the same number of bits. Also each of the frames does not require all of the bits. Assuming the first frame to be coded requires 1400 bits, the remaining unused 86 bits are stored in the Bit Reservoir and can be used in succeeding frames. For the next adjacent frame we will have a total of 1572 bits (1486 bits+86 bits in the Bit Reservoir) available for coding. For example, if the next adjacent frame is a short frame more bits can be allocated for coding.

In some embodiments, less than the average number of bits are used for encoding the large frames (using a reduction factor) and the remaining bits are stored in the Bit Reservoir. For example, in the above case only 1300 bits are allocated for each of the large frames. Then the remaining 186 bits (reduction factor) are stored in the Bit Reservoir.

Generally the Bit Reservoir cannot be used to store a large number of remaining bits. Therefore, a maximum limit is set for the number of bits that can be stored in the Bit Reservoir, and anytime the number of bits exceeds the maximum limit, the excess bits are allocated to the next frame. In the above example, if the bit reservoir has exceeded the maximum limit, then the next frame will receive 1300 bits along with the number of bits by which the Bit reservoir has exceeded the limit.

In the above-described operation 600 when the next frame is a small frame (small frames generally occur rarely), then more bits are allocated to the small frame from the Bit Reservoir. The number of extra bits that can be allocated to the small frame is dependent on two factors. One is the number of bits present in the Bit Reservoir and the other is the number of consecutive small blocks present in the input audio signal. Basically the strategy described in the above operation 600 is to remove bits from the long frames and to allocate the removed bits to the small frames as needed.

Figure 7:
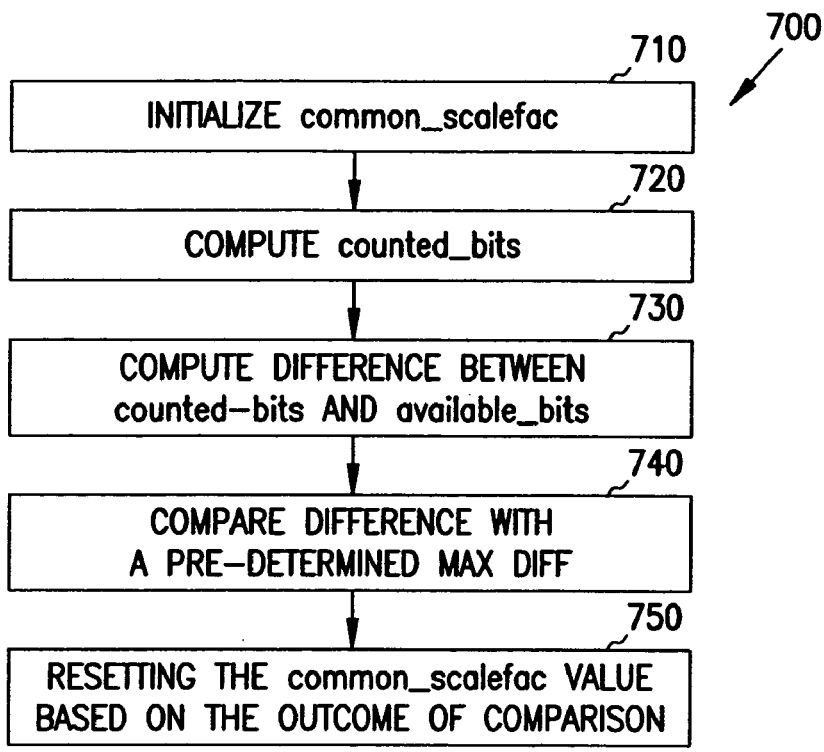
FIG. 7 is a flowchart illustrating the operation of the Quantizer shown in FIGS. 1 and 2 according to the teachings of the present invention.

FIG. 7 illustrates one example embodiment of operation 700 of reducing computational iterations during compression by a perceptual encoder to improve the operational efficiency of the perceptual audio coder. The operation 700 begins with step 710 by initializing common scalefac for the current frame. In some embodiments, the common scalefac is initialized using a common scalefac value of a previous frame adjacent to the current frame. In some embodiments, this is the common scalefac value obtained during the first call of the Rate Control Loop in the previous frame of the corresponding channel and is denoted as predicted common scalefac. In some embodiments, the initial value of the common scalefac is set to start common scalefac+1 when the predicted common scalefac value is not greater than the common scalefac value. In some embodiments, the common scalefac includes a global gain for a given set of spectral values within the frame. The minimum value of common scalefac or the global gain is referred to as start common scalefac value. The value of quantizer change, which is the step-size for changing the value of common scalefac in the iterative algorithm, is set to 1.

At 720 counted bits associated with the current frame are computed. In some embodiments, computing counted bits includes qunatizing the spectrum of the current frame and then computing the number of bits required to encode the quantized spectrum of the current frame.

At 730 a difference between the computed counted bits and available bits are computed. In some embodiments, the available bits are the number of bits made available to encode the spectrum of the current frame. In some embodiments, the difference between the computed counted bits and the available bits are computed by comparing the computed counted bits with the available bits.

At 740 the computed difference is compared with a pre-determined MAXDIFF value. Generally, the value of pre-determined MAXDIFF is set to be in the range of about 300-500.

At 750 the common scalefac value and quantizer change value are reset based on the outcome of the comparison. In some embodiments, the common scalefac value is reset when the computed difference is greater than the pre-determined MAXDIFF, and the common scalefac value is changed based on the outcome of the comparison when the computed difference is less than or equal to the pre-determined MAXDIFF value.

In some embodiments, the changing of the common scalefac value based on the outcome of the comparison further includes storing the computed counted bits along with the associated common scalefac value, then comparing the counted bits with the available bits, and finally changing the common scalefac value based on the outcome of the comparison.

In some embodiments, changing the common scalefac value based on the outcome of the comparison further includes assigning a value to a quantizer change, and changing the common scalefac value using the assigned value to the quantizer change and repeating the above steps when the counted bits is greater than the available bits. Some embodiments include restoring the counted bits and outputting the common scalefac value when the counted bits is less than or equal to available bits.

In some embodiments, resetting the common scalefac value further includes computing predicted common scalefac value based on stored common scalefac value of the previous frame adjacent to the current frame, and resetting the common scalefac value. In case counted bits is greater than available bits, common scalefac is set to the start common scalefac value+64, when the start common scalefac value+64 is not greater than predicted common scalefac value, otherwise common scalefac is set to predicted common scalefac and quantizer change is set to 64. Some embodiments include setting common scalefac to start common scalefac+32, and further setting quantizer change to 32 when the counted bits is less than or equal to available bits and the common scalefac is not greater than start common scalefac+32 and if predicted common scalefac is greater than the present common scalefac, recomputing counted bits. Further, some embodiments include setting the start common scalefac+64 when the counted bits is less than or equal to available bits, and the common scalefac value is greater than the start common scalefac+32 and if predicted common scalefac is greater than the present common scalefac, recomputing counted bits.

Figure 8:
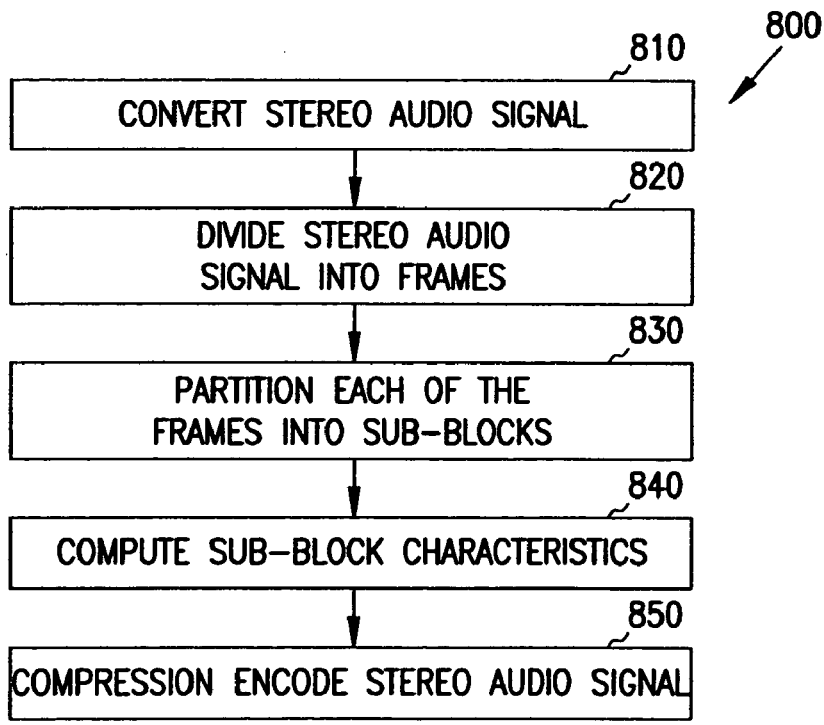
FIG. 8 is a flowchart illustrating the overall operation of the embodiment shown in FIG. 2 when compression encoding a stereo audio signal according to the teachings of the present invention.

FIG. 8 illustrates one example embodiment of operation 800 of stereo coding to improve sound quality according to the present invention. The operation 800 begins with step 810 by converting left and right audio signals into left and right digital audio signals, respectively. Step 820 divides each of the converted left and right digital audio signals into frames having a long-block frame length. In some embodiments, the long-block frame length includes 1024 samples of digital audio signal.

Step 830 includes partitioning each of the frames into corresponding multiple left and right short-blocks having short-block frame length. In some embodiments, the short-block frame-length includes samples in the range of about 100 to 300 samples of digital audio signal.

Step 840 includes computing left and right short-block characteristics for each of the partitioned left and right short-blocks. In some embodiments, the computing the short-block characteristics includes computing the sum and difference short-block characteristics by summing and subtracting respective samples of the digital audio signals in the left and right short-blocks. In some embodiments, computing the sum and difference short-block characteristics further includes computing sum and difference energies in each of the short-blocks in the left and right short-blocks by squaring each of the samples and adding the squared samples in each of the left and right short-blocks. In addition, the short-block energy ratio is computed for each of the short-blocks computed sum and difference energies, further determining a number of short-blocks whose computed short-block energy ratio exceeds a pre-determined energy ratio value.

Step 850 includes encoding the stereo audio signal based on the computed short-block characteristics. In some embodiments, the encoding of the stereo signal includes using a sum and difference compression encoding technique to encode the left and right audio signals based on the determined number of short-blocks exceeding the pre-determined energy ratio value. In some embodiments, the pre-determined energy value is greater than 0.75 and less than 0.25.

Figure 9:
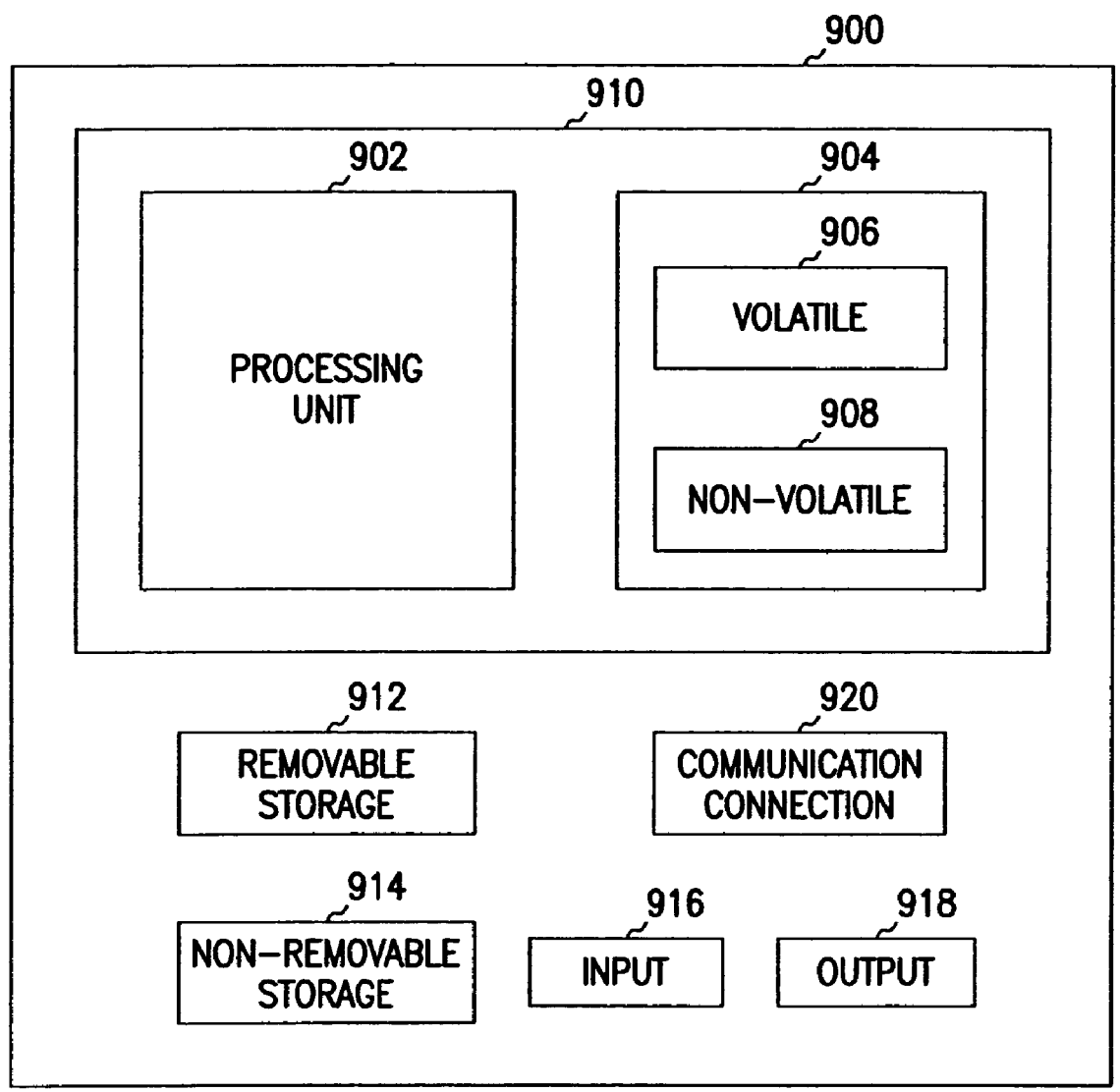
FIG. 9 shows an example of a suitable computing system environment for implementing embodiments of the present invention, such as those shown in FIGS. 1-8.

FIG. 9 shows an example of a suitable computing system environment 900 for implementing embodiments of the present invention, such as those shown in FIGS. 1-8. Various aspects of the present invention are implemented in software, which may be run in the environment shown in FIG. 9 or any other suitable computing environment. The present invention is operable in a number of other general purpose or special purpose computing environments. Some computing environments are personal computers, server computers, hand held devices, laptop devices, multiprocessors, microprocessors, set top boxes, programmable consumer electronics, network PCS, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or implement particular abstract data types. In a distributed computing environment, program modules may be located in local or remote storage devices.

FIG. 9 shows a general computing device in the form of a computer 910, which may include a processing unit 902, memory 904, removable storage 912, and non-volatile memory 908. Computer 910 may include—or have access to a computing environment that includes—a variety of computer-readable media, such as volatile 906 and non-volatile memory 908, removable and non-removable storages 912 and 914, respectively. Computer storage includes RAM, ROM, EPROM & EEPROM, flash memory or other memory technologies, CD-ROM, digital versatile disks (DVD) or other optical disk storage, magnetic cassettes, magnetic tape, magnetic disk storage or other magnetic storage devices, or any other medium capable of storing computer-readable instructions. Computer 910 may include—or have access to a computing environment that includes—input 916, output 918, and a communication connection 920. The computer 910 may operate in a networked environment using a communication connection 920 to connect to one or more remote computers. The remote computer may include a personal computer, server, router, network PC, a peer device or other common network node, or the like. The communication connection 920 may include a local area network (LAN), a wide area network (WAN) or other networks.

CONCLUSION

The above-described invention increases compression efficiency by providing a technique to allocate bits between long and short-blocks. Also, the present invention significantly enhances the sound quality of the encoded audio signal by more accurately detecting an attack and reducing pre-echo artifacts caused by attacks. In addition, the present invention provides an audio coder that is computationally efficient and more accurate in switching between the normal and the M-S modes when the audio signal is a stereo signal.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. An improved method for detecting an attack in an input audio signal to reduce a pre-echo artifact caused by an attack during compression encoding of the input audio signal, comprising:
   converting, by a processor, the input audio signal into a digital audio signal;
   dividing the digital audio signal into large frames having a long-block frame length;
   partitioning each of the large frames into multiple short-blocks;
   computing short-block audio signal characteristics for each of the short-blocks based on changes in the input audio signal;
   comparing the computed short-block audio signal characteristics to a set of threshold values to detect a presence of the attack in each of the short-blocks; and
   changing the long-block frame length of one or more large frames based on the outcome of the comparison to reduce the pre-echo artifact caused by the attack;
   wherein detecting the attack comprises detecting a sudden increase in amplitude within the long-block frame length;
   wherein the long-block frame length comprises 1024 samples of digital audio signal;
   wherein the long-block frame length comprises a frame length used when there is no attack in the input audio signal;
   wherein computing the short-block audio signal characteristics further comprises computing inter-block differences and determining a maximum inter-block difference from the computed inter-block differences;
   wherein computing the short-block audio signal characteristics further comprises computing inter-block ratios and determining a maximum inter-block ratio from the computed inter-block ratios;
   wherein computing the inter-block differences comprises summing a square of differences between samples in adjacent short-blocks; and
   wherein computing the inter-block ratios comprises dividing the adjacent computed inter-block differences.

2. The method of claim 1, wherein the samples of digital audio signal comprise series of numbers.

3. The method of claim 1, wherein the large frames comprise:
   current and previous adjacent frames.

4. The method of claim 1, wherein the short-blocks comprise:
   short-blocks having short-block frame lengths in the range of about 100 to 300 samples.

5. The method of claim 1, wherein comparing the computed short-block values to the set of threshold values comprises:
   comparing the determined maximum inter-block difference and the maximum inter-block ratio to the set of threshold values.

6. The method of claim 1, wherein changing the long-block frame length comprises:
   changing the long-block frame length of the one or more large frames including the attack includes changing the long-block frame length to multiple smaller frames having smaller frame lengths to restrict the attack to one or more smaller frames so that the pre-echo artifact caused by the attack does not spread to the adjacent larger frames.

7. The method of claim 6, wherein each of the smaller-frame lengths comprises about 100 to 300 samples of digital audio signal.

8. The method of claim 6, further comprising:
   computing an average number of bits that can be allocated for each of the large frames;
   computing a perceptual entropy for the current frame of audio samples;

computing a bit rate using a sampling frequency and the current frame length;

computing a reduction factor based on the computed bit rate and the perceptual entropy;

computing a reduced average number of bits that can be allocated for each of the large frames using the computed reduction factor;

computing remaining bits by subtracting the computed average number of bits with the computed reduced average number of bits;

if the current frame to be coded is a large frame, then allocating the reduced average number of bits to the current frame and storing the remaining bits in a Bit Reservoir; and if the current frame to be coded is a small frame, then allocating the reduced average number of bits along with the stored bits from the Bit Reservoir to the current frame.

9. The method of claim 8 further comprising:
repeating the above steps for a next adjacent frame.

10. The method of claim 9, wherein computing the average number of bits further comprises:
determining a bit rate of the input audio signal;
determining the long-block frame length of the large frame;
determining a sampling frequency of the input audio signal; and
computing the average number of bits that can be allocated for each of the large frames based on the determined bit rate, long-block frame length, and sampling frequency.

11. An apparatus to detect an attack in an input digital audio signal to reduce a pre-echo artifact caused by the attack during compression encoding of the input digital audio signal, comprising:
a plurality of processors;
a time frequency generated to receive the digital audio signal and divide the signal digital audio signal into large frames having a long-block frame length, and to further partition each of the large frames into multiple short-blocks;
a transient detection module coupled to the time frequency generator to receive the multiple short-blocks and compute short-block audio signal characteristics for each of the received multiple short blocks based on changes in the input digital audio signal, wherein the transient detection module compares the computed short-block audio signal characteristics to a set of threshold values to detect a presence of the attack in each of the multiple short-blocks, and the transient detection module further changes the long-block frame length of one or more large frames including the attack based on the outcome of the comparison, wherein the time frequency generator receives the changed one or more large frames and compress the changed one or more large frames to reduce the pre-echo artifact caused by the attack;
wherein the attack comprises a sudden increase in amplitude within the long-block frame length of the large frame of digital audio signal;
wherein the large frames comprise a current and a previous adjacent frame;
wherein the transient detection module further computes inter-block differences and determines a maximum inter-block difference from the computed inter-block differences;
wherein the transient detection module further computes inter-block ratios and determining a maximum inter-block ratio from the computed inter-block ratios;
wherein the transient detection module further computes inter-block ratios by dividing adjacent computed inter-block differences.

12. The apparatus of claim 11, wherein the long-block frame length comprises 1024 samples of digital audio signal.

13. The apparatus of claim 12, wherein the samples of digital audio signal comprise samples selected from the group consisting of series of numbers and bits.

14. The apparatus of claim 12, wherein long-block frame length comprises a frame length used when there is no attack in the input digital audio signal.

15. The apparatus of claim 11, wherein the short-blocks comprise a frame length in the range of about 100 to 300 samples.

16. The apparatus of claim 11, wherein the transient detection module further computes the inter-block differences by summing the samples in each of the short-blocks to obtain a short-block signal for each of the short-blocks, and further computes the inter-block differences by using the summed short-block signals of adjacent short-blocks.

17. The apparatus of claim 11, wherein the transient detection module compares the determined maximum inter-block difference and the maximum inter-block ratio to a set of threshold values to detect the presence of the attack.

18. The apparatus of claim 11, wherein the transient detection module changes the long-block frame length of the one or more large frames including the attack to multiple smaller frames having smaller frame lengths to restrict the attack to one or more smaller frames so that the attack does not spread to the adjacent large frames to reduce the pre-echo artifact caused by the attack.

19. The apparatus of claim 18, wherein each of the smaller frame lengths comprises samples in the range of about 100 to 200 samples of digital audio signal.

20. The apparatus of claim 11, further comprising:
a psychoacoustic model coupled to the transient detection module to compute a perceptual entropy for the current frame including samples of digital audio signal;
a quantizer coupled to the time frequency generator and the psychoacoustic model to receive the large and smaller frames including the samples of digital audio signal from the time frequency generator and the computed perceptual entropy from the psychoacoustic model, wherein the quantizer further comprises:
a Bit Allocator to compute an average number of bits that can be allocated to each of the received large frames, and to compute a bit rate and a reduction factor based on the computed bit rate, and the received perceptual entropy, the Bit Allocator further computing a reduced average number of bits that can be allocated for each of the large frames using the computed reduction factor, and further computing remaining bits by subtracting the computed average number of bits using the computed reduced average number of bits; and
a Bit Reservoir to receive the remaining bits, wherein the Bit Allocator allocates a reduced average number of bits to the current frame and stores the remaining bits in the Bit Reservoir when the current frame is a large frame, and wherein the Bit Allocator further allocates the reduced number of bits along with the stored bits from the Bit Reservoir when the current frame is a small frame to improve the bit allocation between the large and small frames to enhance sound quality of the compressed audio signal.

21. The apparatus of claim 20, wherein the Bit Allocator repeats the bit allocation to a next adjacent frame.

22. The apparatus of claim 20, wherein the Bit Allocator determines the average number of bits by using the bit rate, the long-block frame length, and the sampling frequency.

23. The apparatus of claim 20, wherein the quantizer further comprises:
- a memory to store a start common scalefac of the previous adjacent frame to use in computation of the current frame;
- a Rate Control Loop to compute common scalefac of the current frame using the stored start common scalefac as a starting value during computation of iterations by the Rate control Loop to reduce the number of iterations required to compute the common scalefac of the current frame, and the Rate Control Loop further to compute counted bits using the common scalefac of the current frame; and
- a comparator coupled to the Rate Control Loop to compare the computed count bits with available bits, wherein the Rate Control Loop changes computed common scalefac based on the outcome of the comparison.

24. The apparatus of claim 23, wherein the start common scalefac comprises:
- a global gain for a given set of spectral values within the previous adjacent frame.

25. The apparatus of claim 24, wherein the count bits comprises:
- bits required to encode a given set of spectral values for the current frame.

26. The apparatus of claim 23, wherein the Rate-Control Loop intializes the common scalefac value with a predicted common scalefac obtained during a first call of the Rate Control Loop in the previous adjacent frame of a corresponding channel.

* * * * *

UNITED STATES PATENT AND TRADEMARK OFFICE
CERTIFICATE OF CORRECTION

PATENT NO. : 7,930,170 B2  
APPLICATION NO. : 10/466027  
DATED : April 19, 2011  
INVENTOR(S) : K. P. P. Kalyan Chakravarthy et al.

It is certified that error appears in the above-identified patent and that said Letters Patent is hereby corrected as shown below:

On the Title page, in field (75), in "Inventors", in column 1, line 5, delete "Bishwarup Molndal" and insert -- Bishwarup Mondal --, therefor.

In column 15, line 36, in Claim 11, delete "generated" and insert -- generator --, therefor.

In column 15, line 37, in Claim 11, after "the" delete "signal".

In column 15, line 40, in Claim 11, after "blocks;" insert -- and --.

In column 15, line 44, in Claim 11, delete "short blocks" and insert -- short-blocks --, therefor.

In column 15, lines 53-54, in Claim 11, delete "compress" and insert -- compresses --, therefor.

In column 15, line 66, in Claim 11, delete "determining" and insert -- determines --, therefor.

In column 15, line 67, in Claim 11, after "ratios;" insert -- and --.

In column 17, line 12, in Claim 23, delete "Rate control" and insert -- Rate Control --, therefor.

In column 18, line 11, in Claim 26, delete "Rate-Control" and insert -- Rate Control --, therefor.

In column 18, line 12, in Claim 26, delete "intializes" and insert -- initializes --, therefor.

Signed and Sealed this
Seventh Day of June, 2011

David J. Kappos
*Director of the United States Patent and Trademark Office*